United States Patent
Murata et al.

[11] Patent Number: 5,913,398
[45] Date of Patent: Jun. 22, 1999

[54] CLUTCH DISC ASSEMBLY HAVING A CUSHIONING PLATE

[75] Inventors: Ikuo Murata; Yasuyuki Hashimoto, both of Neyagawa; Hiroshi Teramae, Nara, all of Japan

[73] Assignee: EXEDY Corporation, Neyagawa, Japan

[21] Appl. No.: 08/889,804

[22] Filed: Jul. 8, 1997

Related U.S. Application Data

[63] Continuation-in-part of application No. 08/512,779, Aug. 9, 1995, Pat. No. 5,651,442.

[30] Foreign Application Priority Data

Jul. 10, 1996 [JP] Japan .................................. 8-180937

[51] Int. Cl.$^6$ .................................................. F16D 69/04
[52] U.S. Cl. ...................................... 192/107 C; 192/52.6
[58] Field of Search .............................. 192/107 C, 52.6; 29/464

[56] References Cited

U.S. PATENT DOCUMENTS

| 2,307,006 | 12/1942 | Wemp | 192/107 C |
| 4,422,539 | 12/1983 | Werner | 192/107 C |
| 5,651,442 | 7/1997 | Murata et al. | 192/107 C |

FOREIGN PATENT DOCUMENTS

| 2550592 | 2/1985 | France | 192/107 C |

*Primary Examiner*—Richard M. Lorence
*Attorney, Agent, or Firm*—Shinjyu An Intellectual Property Firm

[57] ABSTRACT

A frictionally engaging clutch disc assembly includes portions which define alignment holes which are employed during assembly of the clutch disc assembly. A tooling jig having alignment pins are engaged in the alignment holes such that the various portions of the clutch disc assembly are accurately positioned with respect to one another during construction of the clutch disc assembly.

5 Claims, 4 Drawing Sheets

CLUTCH DISC ASSEMBLY HAVING A CUSHIONING PLATE

This application is a continuation-in-part of application Ser. No. 08/512,779, filed Aug. 9, 1995, now U.S. Pat. No. 5,651,442.

BACKGROUND OF THE INVENTION

1. Field of the Invention

The present invention relates to a cushioning plate, a clutch coupler, a method for assembling the clutch coupler, and a clutch disc assembly.

2. Description of the Related Art

In one type of clutch disc assembly, the construction includes a clutch disc main body and a subassembly concentrically joined to the clutch disc main body, functioning to engage frictionally an engine flywheel with a clutch pressure plate. The clutch disc main body incorporates a damper for dampening shock caused as the clutch is engaged, as well as spurious torsional vibrations during power transmission by the clutch. The clutch disc subassembly includes a cushioning plate peripherally fixed to the clutch disc main body, and friction facings fixed by rivets to opposite radially extending sides of the cushioning plate.

The frictionally engaging clutch disc subassembly, when pressed by a pressure plate against an engine flywheel, functions to transmit torque from the flywheel to the clutch disc. As the clutch disc subassembly is urged into contact against the flywheel, the cushioning plate deforms elastically, absorbing engagement shock.

In assembling the disc subassembly for the conventional clutch disc as stated above, the cushioning plate is first fixed to a clutch plate assembly of the clutch disc by rivets. One of the pair of friction facings is then fixed to one of the radially extending sides of the cushioning plate by rivets, whereupon the second of the friction facings pair is riveted onto the opposite radially extending side. Herein, there may be no direct coordination between the steps of mounting the one and the other of the friction facings onto the opposite radially extending sides of the cushioning plate. Consequently, the friction facings sandwiching the cushioning plate in the assembled clutch disc are not likely to be perfectly paired, but rather may be out of alignment with respect to each other. Of particular concern is radial misalignment of the opposed friction facings, whereby there is significant disparity in the moment arms of the opposite radially extending sides of the cushioning plate.

Accordingly, unless an operator intervenes in the assembling process to check and ensure proper alignment of the respective components that make up the clutch disc subassembly, the clutch disc will rotate out of balance, and vibrations will develop in the operational friction engaging subassembly as well. The need for operator intervention has impeded automation of the entire clutch disc assembling process.

This problem may be addressed by aligning the cushioning plate and the frictional facings with each other at the time the frictional facings are to be riveted. This alignment may be carried out by providing a positioning hole in the cushioning plate, and engaging a positioning jig such as a pin with the positioning hole. However, the cushioning plate is made of a relatively thin planar member, and therefore if such a positioning hole is formed in the cushioning plate, the mechanical strength of the cushioning plate may be lowered.

SUMMARY OF THE INVENTION

It is therefor an object of the present invention to provide a method for assembling a frictionally engaging subassembly of a clutch disc whereby subassembly components are assembled concentrically into precise alignment with respect to one another, thereby enabling full automation of the clutch disc assembling process and eliminating need for post-manufacture rotational balancing of the clutch disc, while also preventing a reduction in mechanical strength of the cushioning plate.

According to a first aspect of the invention, a clutch disc assembly includes a clutch disc main body and a cushioning plate peripherally fixed to the clutch disc main body. The cushioning plate includes a plurality of cushioning portions disposed on an outer circumferential portion thereof, each of said cushioning portions having a plurality of circumferentially spaced apart rivet holes and at least one cutaway portion formed in an edge portion of each cushioning portion. Two adjacent cutaway portions on separate cushioning portions define a positioning hole.

The clutch disk assembly further includes first and second friction facings, each having spaced apart axial rivet holes and positioning holes, disposed on opposed radially extending sides of the cushioning plate peripherally such that the cushioning plate is sandwiched between the friction facings. A first set of rivets are fitted into the rivet holes in the first friction facing, extending through and deformed to fasten together the cushioning plate and said first friction facing. A second set of rivets are fitted into said rivet holes in the second friction facing, extending through and deformed to fasten together the cushioning plate and the second friction facing. The positioning holes in the cushioning plate are spaced apart from the rivet holes such that the positioning holes are not axially aligned with the rivet holes.

According to a second aspect of the invention, the cutaway portions are formed in both edges of each of the cushioning portions in the circumferential direction.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

Figure 1:
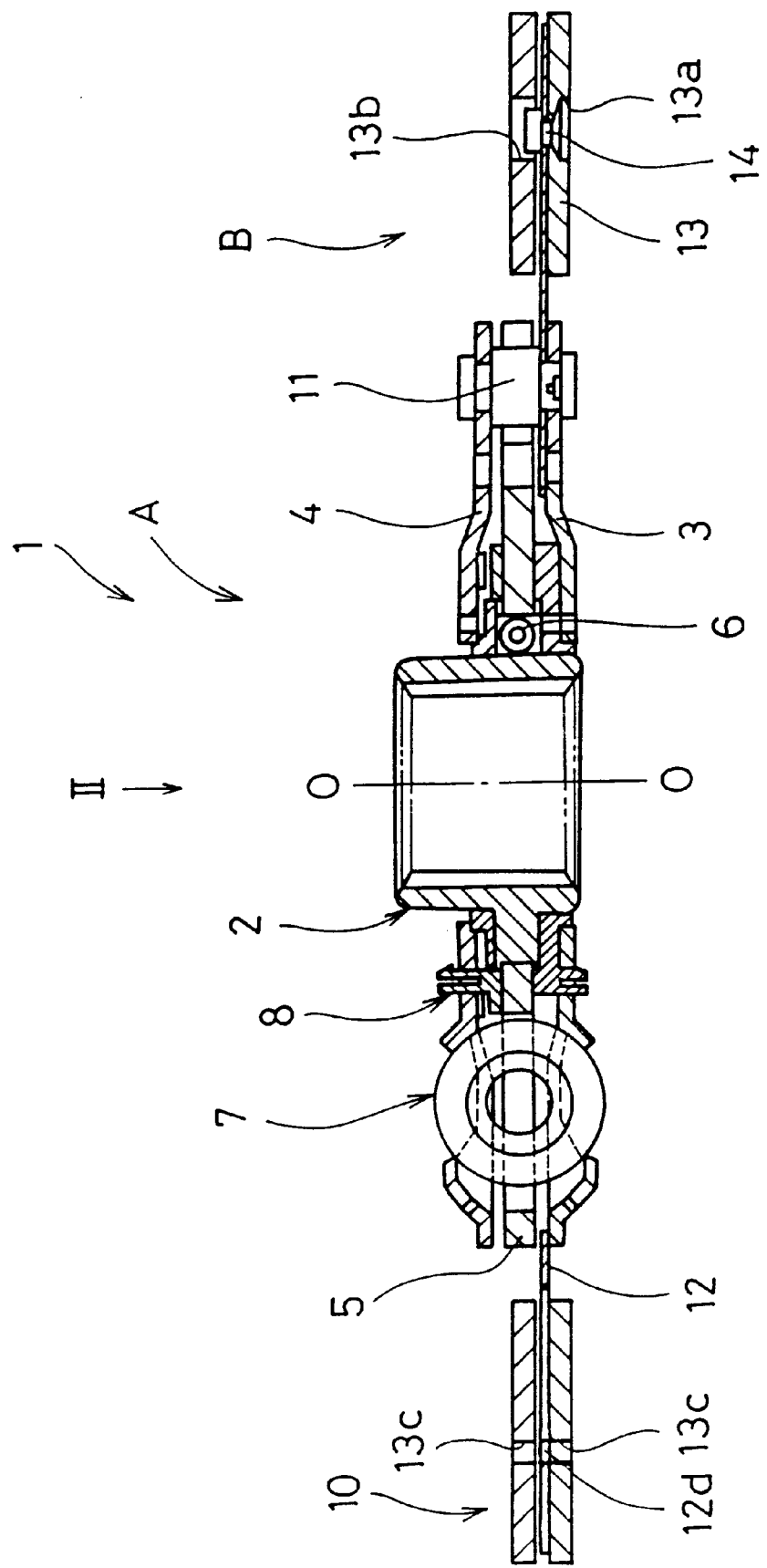
FIG. 1 is an axial section schematically illustrating the clutch disc assembly in accordance with an embodiment of the invention.
Figure 2:
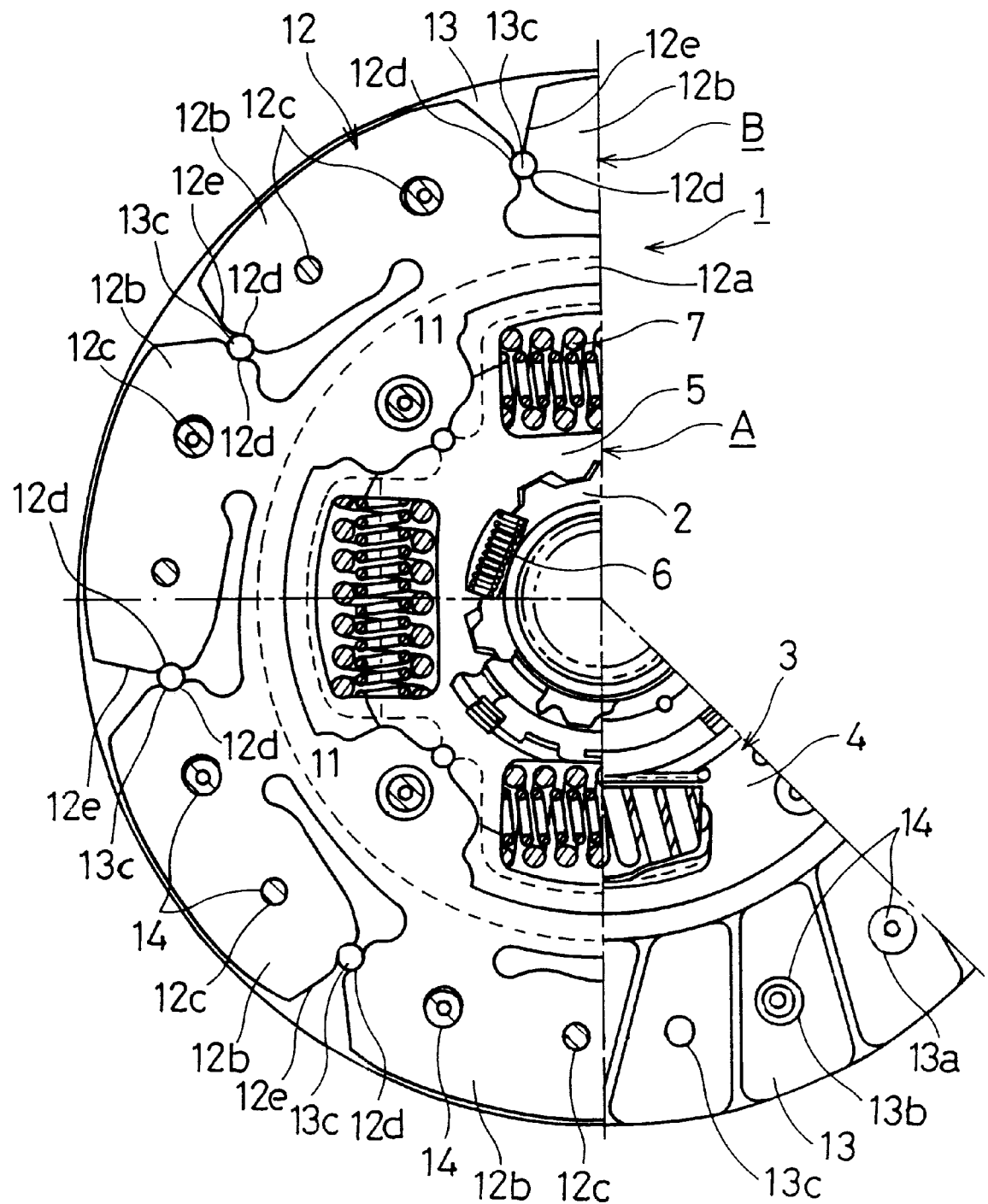
FIG. 2 is a part cut-away, part section, part elevation view of the clutch disc assembly depicted in FIG. 1.

A clutch disc assembly 1 in the preferred embodiment of the present invention, as shown in FIG. 1 and FIG. 2, is a device for selectively transmitting torque between an engine (not shown) and a gearbox (not shown). In FIG. 1, the line O—O denotes the rotational axis of the clutch disc assembly 1.

The clutch disc assembly 1 is composed chiefly of a clutch disc main body A to which a friction engaging subassembly B is peripherally fitted.

The clutch disc main body A includes a hub 2 which serves as a power output element; a clutch disc 3 cooperative with a retaining plate 4 which serves as a power input element; an intervening sub-plate 5 disposed between disc 3 and plate 4; a small coil spring 6 positioned for restricting relative rotary displacement between the sub-plate 5 and the hub 2; a plurality of large coil springs 7 positioned for restricting relative rotary displacement between the disc 3/plate 4 assembly, and the sub-plate 5; and a friction resistance generating structure 8 for generating a friction force in response to relative rotation between the disc 3/plate 4 assembly and the hub 2.

The friction engaging subassembly B is composed chiefly of an annular cushioning plate 12 and two frictional facings 13. The cushioning plate 12 is composed of an annular portion 12a and a plurality of cushioning portions 12b formed integrally around the annular portion 12a. The annular element 12a is fixed to the clutch disc 3 by a contact pin 11. Each cushioning portion 12b is circumferentially tiered so that in a disengaged state, the friction facings 13 are spaced apart from one another, as shown in FIG. 2, but in an engaged state, the tiered cushioning portion 12b is elastically deformed by compression forces bringing the friction facings 13 in closer proximity to one another.

The friction facings 13 are fastened on opposite sides of the cushioning portions 12b to immediately adjacent surfaces thereof by a plurality of rivets 14.

More specifically, two rivet holes 12c and two positioning cutaway portions 12d are formed in each cushioning portion 12b of the cushioning plate 12. A rivet hole 13a, a rivet escape hole 13b and a positioning hole 13c are formed in each friction facing. The rivet hole 13a and the rivet escape hole 13b are formed corresponding to the rivet holes 12c of the cushioning portion 12b, respectively. Each rivet hole 13a of one frictional facing 13 corresponds to the rivet escape hole 13b of the other frictional facing 13. The head of the rivet 14 is disposed in each rivet hole 13a, and the stem portion thereof penetrates the rivet hole 12c of the cushioning portion 12b. The press-fitted head of the other rivet is disposed in the rivet escape hole 13b of the other frictional facing 13.

The cushioning portions 12b and the positioning cutaway portions 12d will now be described in more detail. As is apparent from FIG. 2, there are eight cushioning portions 12b formed around the outer circumference of the cushioning plate 12. An intermediate portion of each cushioning portion 12b in the longitudinal direction is integral with an outer circumference of the annular portion 12a. Each positioning cutaway portion 12d is generally arcuate in shape and formed in a intermediate portion of each side edge 12e of each cushioning portion 12b. Each adjacent pair of positioning cutaway portions 12d generally define a positioning hole, and each of the positioning holes defined by the cutaway portions 12d are aligned with the positioning holes 13c in the friction facings 13 in the axial direction.

In vehicular installation, the engine flywheel (not shown) will be situated axially opposing the friction facings 13. When a clutch pressure plate (not shown) clamps the friction facings 13 against the flywheel, torque is input from the engine to the clutch disc assembly 1. When the clutch is engaged in this manner, the torque is transmitted through the friction facings 13 and the cushioning plate 12 to the clutch disc 3, and a centrifugal force concomitant with the rotation of the clutch disc body A or a force corresponding to the transmitted torque is applied to each cushioning portion 12b. Because each positioning holes is defined by adjacent cutaway portions 12d and is not formed as a drilled hole in each cushioning portion 12b, reduction in mechanical strength of the cushioning plate 12 is minimized.

A method of assembling the clutch disc assembly 1, in particular, a method of assembling the friction engaging subassembly B will now be described, where the above-described rivet holes, as well as the positioning holes defined by the cutaway portions 12d in the cushioning plate 12 and the positioning holes 13c in the friction facings 13 have been formed prior to assembly.

Prior to assembly of the clutch disc main body A the cushioning plate 12 will have been peripherally fixed by the contact pins 11 to the main body A.

An annular locating jig 15 is used in assembling the subassembly B. A plurality of rivet receive seats 15a and a plurality of positioning pins 15b are disposed circularly spaced apart on the annular main body of the locating jig 15. The rivet receive seats 15 correspond in number and position to the number and position of the positioning holes 13a in the friction facing 13. The positioning pins 15b correspond in number and position to the number and position of the positioning holes defined by the cutaway portions 12d in each cushioning plate 12.

Figure 3:
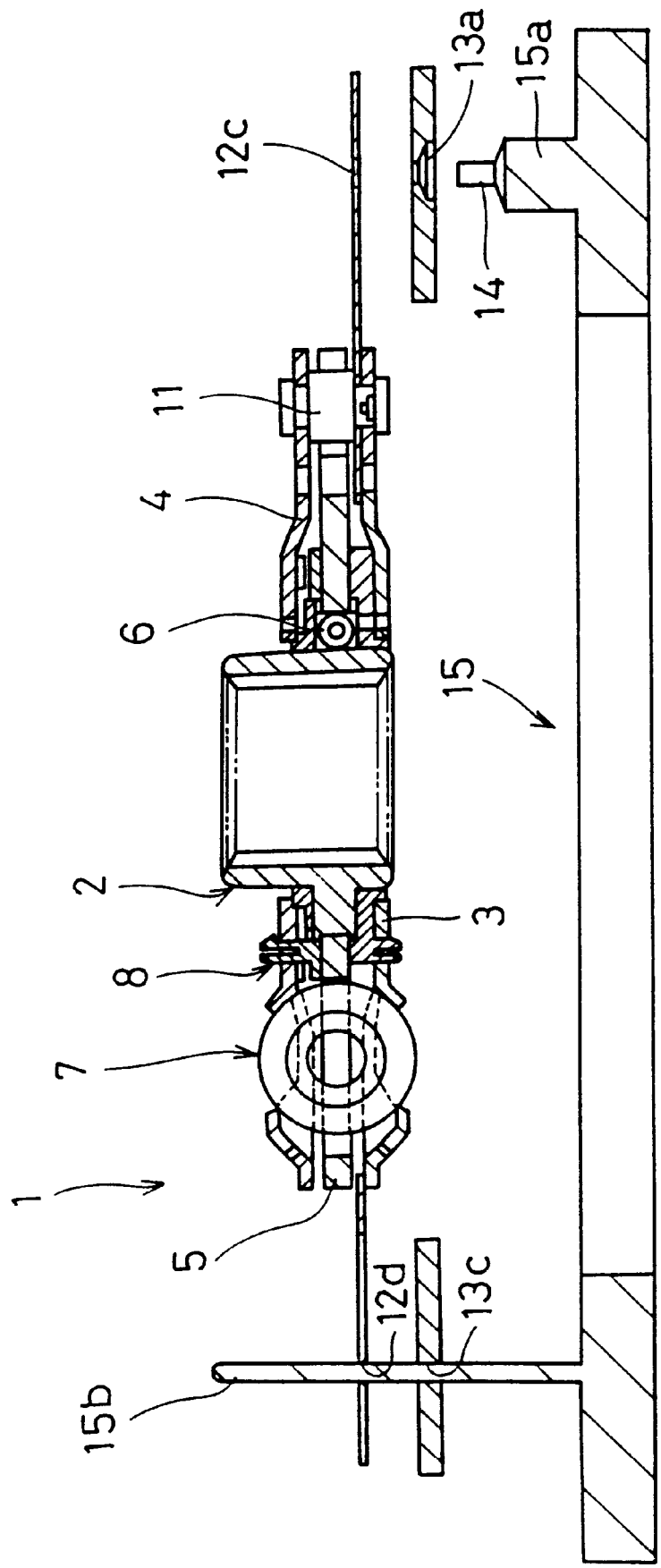
FIG. 3 is a side section similar to FIG. 2 of the clutch disc assembly, together with an aligning jig, in an assembling stage wherein a first friction facing is attached to the clutch disc assembly.

(1) With reference to FIG. 3, in order to fasten the friction facing 13 to the cushioning plate 12, unfinished rivets 14 are set onto the rivet receive seats 15a of the locating jig 15. The friction facing 13 is positioned onto the locating jig 15, fitting the locating pins 15b into the locating holes 13c, whereby the rivet holes 13a each contain the shank of a rivet 14. Then the cushioning plate 12 is seated, engaging the positioning holes 12d' onto the locating pins 15b, wherein the rivet holes 12c in the cushioning plate 12 coincide with the rivet holes 13a in the friction facing 13. Thus, the friction facing 13 and the cushioning plate 12 are brought into precise concentric location. The next step is to caulk (deform) the shank tips of the rivets 14 fitted through the rivet holes 12c and 13a, forming second heads opposite the heads set into the rivet holes 13a and consequently fastening together the friction facing 13 and the cushioning plate 12.

Figure 4:
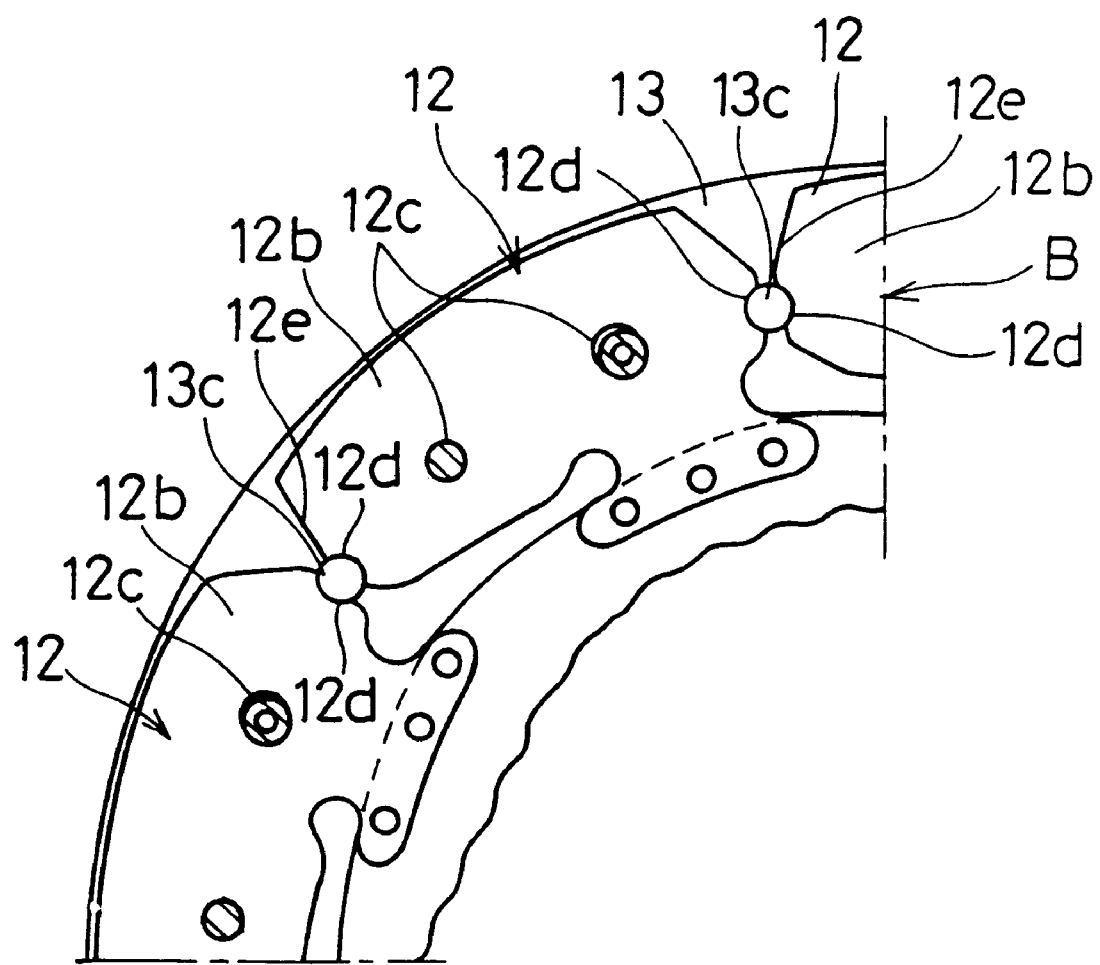
FIG. 4 is a partial plan view showing a cushioning plate in accordance with another embodiment of the invention.

(2) The cushioning plate 12 to which the friction facing 13 has been fixed to one side thereof is taken off of the locating jig 15. Fresh rivets 14 are set on the rivet receive seats 15a. Another friction facing 13 is then positioned on the locating jig 15, fitting the locating pins 15b into the locating holes 13c. Meanwhile, the clutch disc 1 main body A, with the now partially assembled subassembly B, is then rotated about one of the aforementioned axes of symmetry. The cushioning plate 12 having one friction facing 13 already fixed thereto, is set into position on the jig 15, the positioning holes defined by the cutaway portions 12d and 13c engaging the aligning pins 15b of the locating jig 15. Accordingly, the rivet recess holes 13b of the friction facing 13, now inverted with respect to the aligning jig 15 as shown in FIG. 4, coincide with the rivet holes 13a of the second friction facing 13, and with the rivet seats 15a carrying fresh rivets 14. Subsequently, the shank tips of the second set of rivets 14, extending through the rivet holes 13a of the second friction facing 13, and through the cushioning plate 12 rivet holes 12c, are caulked. The second friction facing 13 and the cushioning plate 12 are consequently fastened together, forming a finished friction engaging subassembly B of the clutch disc 1.

The two friction facings 13, fastened to the cushioning plate 12 as described above, are meanwhile located in axially opposed precise correspondence, such that there will be little if any positional deviation among the components.

Rotational balance of the clutch disc assembly 1 will be satisfactory, consequently minimizing the likelihood that the clutch subassembly B will give rise to vibration in operation. Further, positioning the two friction facings 13 on the cushioning plate 12 eliminates the need for an operator alignment check, enabling the clutch subassembly B assembling procedure to be automated.

In an alternate embodiment shown in FIG. 4, the clutch disc 1 subassembly B may employ a non-integral cushioning plate made from a plurality of separate flat portions attached to the disc 3/plate 4 assembly. Such a configuration will attain the same features as in the above-described embodiment.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A clutch disc assembly, comprising:

a clutch disc main body;

a cushioning plate peripherally flood to said clutch disc main body, said cushioning plate having a plurality of cushioning portions disposed on an outer circumferential portion thereof, each of said cushioning portions having a plurality of circumferentially spaced apart rivet holes and at least one cutaway portion formed in an edge portion of each cushioning portion, with two adjacent cutaway portions on separate cushioning portions defining a positioning hole;

first and second friction facings, each having spaced apart axial rivet holes and positioning holes, disposed on opposed radially extending sides of said cushioning plate peripherally such that said cushioning plate is sandwiched between said friction facings;

a first set of rivets fitted into said rivet holes in the first friction facing, extending through and deformed to fasten together said cushioning plate and said first friction facing; and a second set of rivets fitted into said rivet holes in the second fiction facing, extending through and deformed to fasten together said cushioning plate, and said second friction facing.

2. The clutch disk assembly according to claim 1, wherein said cutaway portions are formed in both edges of each of said cushioning portions in the circumferential direction.

3. The clutch disk assembly according to claim 1, wherein said cushioning portions are fixed to said clutch disc main body.

4. The cluth disk assembly according to claim 1, wherein said cushionig porsions and said cushioning plate are integrally formed as a single member.

5. The clutch disk assembly according to claim 1, wherein a plurality of said positioning holes art formed between corresponding ones of said adjacent cutaway portions on said cushioning portions and a plurality of said rivet holes are formed in said first and second friction facings and said positioning holes in said cushioning plate are spaced apart from said rivet holes such that said positioning holes are not axially aligned with said rivet holes.

* * * * *